(12) United States Patent
Voigt

(10) Patent No.: US 7,171,396 B2
(45) Date of Patent: Jan. 30, 2007

(54) METHOD AND PROGRAM PRODUCT FOR SPECIFYING THE DIFFERENT DATA ACCESS ROUTE FOR THE FIRST DATA SET INCLUDES STORING AN INDICATION OF THE DIFFERENT ACCESS FOR THE FIRST DATA SET PROVIDING ALTERNATIVE DATA ACCESS ROUTES TO A DATA STORAGE

(75) Inventor: Douglas L. Voigt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 10/116,338

(22) Filed: Apr. 4, 2002

(65) Prior Publication Data

US 2003/0191734 A1 Oct. 9, 2003

(51) Int. Cl.
 *G06F 17/30* (2006.01)
 *G06F 17/00* (2006.01)
 *G06F 12/00* (2006.01)
(52) U.S. Cl. .................... 707/1; 707/100; 707/200; 711/100; 711/163
(58) Field of Classification Search .............. 707/1–2, 707/100–104.1, 200–206, 10; 709/203–205; 711/113, 133, 159–160, 100, 111, 161–163, 711/209; 370/248; 726/23–24
See application file for complete search history.

(56) References Cited

U.S. PATENT DOCUMENTS

| | | | |
|---|---|---|---|
| 5,392,244 A | | 2/1995 | Jacobson et al. |
| 5,437,029 A | * | 7/1995 | Sinha ................... 707/200 |
| 5,506,986 A | * | 4/1996 | Healy .................. 707/204 |
| 5,542,065 A | * | 7/1996 | Burkes et al. ......... 711/114 |
| 5,546,558 A | * | 8/1996 | Jacobson et al. ...... 711/114 |

(Continued)

FOREIGN PATENT DOCUMENTS

EP 0405859 A2 * 6/1990 ............ 11/16

(Continued)

OTHER PUBLICATIONS

Walter A Burkhard et al. "Storage-efficient reliable files", 1992, 10 pages.*

(Continued)

*Primary Examiner*—Srirama Channavajjala

(57) ABSTRACT

A data storage system includes file system processes, array controller processes, and one or more data storage devices accessed through the array controller processes. Certain file system access operations are diverted from the file system processes so that the array controller processes can directly perform the requested access operation. The array controller processes then communicate with the file system processes so that the file system processes may update the file system data management arrangement as appropriate. Thus, the hierarchical file system management is maintained while the storage media may be accessed through one of multiple routes in response to a file system access operation request. The particular access route for a given file in the system is determined by a route determinant characteristic of the file. The access route for a file may be switched when it is determined that the route determinant characteristic for the file is inconsistent with the then specified route for that file.

27 Claims, 9 Drawing Sheets

U.S. PATENT DOCUMENTS

| | | | | |
|---|---|---|---|---|
| 5,553,285 | A * | 9/1996 | Krakauer et al. | 707/202 |
| 5,623,598 | A * | 4/1997 | Voigt et al. | 714/47 |
| 5,682,549 | A * | 10/1997 | Tanaka et al. | 710/8 |
| 5,809,527 | A * | 9/1998 | Cooper et al. | 711/133 |
| 5,857,459 | A * | 1/1999 | Snow et al. | 128/204.21 |
| 5,867,640 | A * | 2/1999 | Aguilar et al. | 714/6 |
| 5,875,459 | A | 2/1999 | Taoda | |
| 5,933,824 | A * | 8/1999 | DeKoning et al. | 707/8 |
| 5,960,451 | A * | 9/1999 | Voigt et al. | 711/114 |
| 5,974,503 | A * | 10/1999 | Venkatesh et al. | 711/114 |
| 5,978,815 | A * | 11/1999 | Cabrera et al. | 707/204 |
| 6,018,695 | A * | 1/2000 | Ahrens et al. | 701/200 |
| 6,041,324 | A * | 3/2000 | Earl et al. | 707/9 |
| 6,055,527 | A * | 4/2000 | Badger et al. | 707/2 |
| 6,092,168 | A * | 7/2000 | Voigt | 711/170 |
| 6,185,574 | B1 * | 2/2001 | Howard et al. | 707/200 |
| 6,195,650 | B1 * | 2/2001 | Gaither et al. | 707/1 |
| 6,442,141 | B1 * | 8/2002 | Borella et al. | 370/248 |
| 6,442,682 | B1 * | 8/2002 | Pothapragada et al. | 713/1 |
| 6,553,509 | B1 * | 4/2003 | Hanson et al. | 714/5 |
| 6,625,623 | B1 * | 9/2003 | Midgley et al. | 707/204 |
| 6,684,313 | B2 * | 1/2004 | Voigt et al. | 711/170 |
| 6,757,631 | B2 * | 6/2004 | Goto et al. | 702/104 |
| 6,782,450 | B2 * | 8/2004 | Arnott et al. | 711/114 |
| 6,804,746 | B2 * | 10/2004 | Duruoz | 711/112 |
| 6,816,891 | B1 * | 11/2004 | Vahalia et al. | 709/214 |
| 6,842,833 | B1 * | 1/2005 | Phillips et al. | 711/162 |
| 6,904,441 | B2 * | 6/2005 | Voigt | 707/205 |
| 6,931,410 | B2 * | 8/2005 | Anderson et al. | 707/100 |
| 6,970,892 | B2 * | 11/2005 | Green et al. | 707/205 |
| 2001/0013040 | A1 * | 8/2001 | Baumeister et al. | 707/201 |
| 2002/0083120 | A1 * | 6/2002 | Soltis | 709/200 |
| 2002/0152226 | A1 * | 10/2002 | Burnett | 707/200 |
| 2003/0110353 | A1 * | 6/2003 | Arnott et al. | 711/114 |
| 2003/0182422 | A1 * | 9/2003 | Bradshaw et al. | 709/225 |
| 2004/0145939 | A1 * | 7/2004 | Yoshida et al. | 365/145 |

FOREIGN PATENT DOCUMENTS

| | | | | |
|---|---|---|---|---|
| EP | 552580 | * | 7/1993 | |
| EP | 1122924 | * | 8/2001 | 29/6 |
| EP | 1221646 | * | 7/2002 | 3/6 |
| EP | 1221646 | A | 7/2002 | |
| EP | 1513079 | * | 3/2005 | 17/30 |
| EP | 1536336 | * | 6/2005 | 11/14 |
| JP | 9223049 | A | 2/1996 | |
| WO | WO 97/46956 | * | 6/1997 | 17/30 |
| WO | WO 2004/059529 | * | 7/2004 | 17/30 |

OTHER PUBLICATIONS

John H Hartman et al., The Zebra striped network file system, High performance mass storage and parallel I/O technologies and applications, 1993, pp. 1-25.*

Ted Anderson et al. "Security Practices in distributed file systems", IBM almaden research center, USA, 4 pages.*

Marshall K McKusick et al. "A fast file system for UNIX",ACM transactions on computer systems, vol. 2, issue 3, Aug. 1984, pp. 181-197.*

Douglas S Santry et al. "Deciding when to forget in the elephant file system", ACM symposium on opeating systems, principles, 1989, pp. 110-123.*

Karl Aberer et al. "Improving data access in P2P systems", IEEE internet computing, Jan.-Feb. 2002pp. 1-11.*

Red Hat's New journaling file system: ext3, copyright 2001 by red Hat, inc. 7 pages.*

Barham,PR, "A fresh approach to file system quality of service", proceedings of the IEEE 7th international workshop on network and operating system support for digital audio and video, 1997, pp. 113-122.*

Parker,D.S. et al. "detection of mutual inconsistency in distributed system", IEEE transactions on software engineering, vol. SE-9,issue 3, 1983, pp. 240-247.*

Mecozzi,D et al. "design for a transparent, distributed file system", eleventh IEEE symposium on Mass storage systems, 1991, pp. 77-84.*

"Storage controller exploits file array technology", Maliniak L., Electronic Design, Apr. 6, 1998 at www.elecdesign.com/Globals/PlanetEE/Content/1144.html.

English language Abstract of JP9223049A, Patent Published Feb. 15, 1996, Patent Owner: Brother Ind.

* cited by examiner

METHOD AND PROGRAM PRODUCT FOR SPECIFYING THE DIFFERENT DATA ACCESS ROUTE FOR THE FIRST DATA SET INCLUDES STORING AN INDICATION OF THE DIFFERENT ACCESS FOR THE FIRST DATA SET PROVIDING ALTERNATIVE DATA ACCESS ROUTES TO A DATA STORAGE

CROSS-REFERENCE TO RELATED APPLICATION

This application is related to U.S. patent application Ser. No. 09/819,265, filed Mar. 27, 2001, now U.S. Pat. No. 6,904,441 and entitled "METHOD AND APPARATUS FOR PROVIDING FILE SYSTEM ACCESS TO A DISK ARRAY," now published as U.S. patent application publication No. 2002/0143793A1 is now U.S. Pat. No. 6,904,441. The entire content of this prior application is hereby incorporated by this reference. The Applicant claims priority from this prior application under 35 U.S.C. §120.

FIELD OF THE INVENTION

This invention relates to data storage systems used with computers and computer networks. In particular, the invention relates to a method and program product for managing and switching data access routes to a data storage arrangement such as a disk array.

BACKGROUND OF THE INVENTION

File systems and disk arrays utilize two different methods for accessing data stored on a data storage medium. The two methods are distinguished by a number of characteristics. In a file system for example, files are accessed using a file abstraction. That is, data is represented by a file which may be opened, closed, created, deleted, read, and written. Data is managed in a file system through a hierarchy of files and directories. This hierarchical data management is commonly seen as a significant advantage over other data management schemes. File systems also support both data sharing and data storage device sharing. Security within data storage devices is based on file and directory level access control lists standardized as part of the file system protocols. Another advantage of file systems is that client/server compatibility is based on a small number of well-supported protocols. However, file system performance is reduced by data storage disk-resident file mapping arrangements which are required to map data for a file to physical or virtual locations of the storage media associated with a data storage device.

A disk array is a storage system that employs a number of separate storage devices or disks and manages data across all of the separate devices. These disk array storage systems are popular for implementing data storage redundancy schemes to guard against individual storage device failures. In contrast to a file system, data is accessed in a disk array using a block storage abstraction. That is, data is mapped to large contiguous storage spaces or logical units and is accessed as blocks contained in these logical units. Each block in a logical unit represents a certain amount of data storage space, commonly 512 bytes of storage space. The stored data in a disk array is managed as physical and virtual data storage devices represented by volumes and/or logical units. Although the block storage abstraction may improve the speed at which large amounts of data may be written and retrieved from the storage devices, there are a number of drawbacks associated with disk arrays as compared to file systems. One drawback is that client/server compatibility for disk arrays is subject to a variety of constraints that vary across clients and servers. Also, disk arrays support only device sharing but not data sharing. Furthermore, security within devices is based on vendor unique features.

Prior related U.S. patent application Ser. No. 09/819,265 now U.S. Pat. No. 6,904,441 discloses a data storage system that provides multiple access routes to a data storage device comprising either a single device or an array of data storage devices. In particular, patent application Ser. No. 09/819,265 is now U.S. Pat. No. 6,904,441 is directed to an arrangement that maintains file abstractions for all data stored in a disk array, while providing for both regular file system access to the disk array and alternatively direct block access. Access routes are preferably specified in the system according to certain route determinant characteristics associated with the respective files. Regardless of how the access routes are selected for particular data, the system disclosed in this prior related application provides multiple routes while maintaining the desirable file system hierarchy. Where file size is selected as the route determinant characteristic, the system disclosed in patent application Ser. No. 09/819,265 is now U.S. Pat. No. 6,904,441 allows large file access to be accelerated by direct array controller access, while allowing small file access in the normal way through both the file system processes and the array controller processes.

SUMMARY OF THE INVENTION

The present invention is directed to the management of access routes in a data storage system that provides multiple alternative data access routes ch as the system disclosed in prior related patent application Ser. No. 09/819,265 is now U.S. Pat. No. 6,904,441. In such systems, the particular access route for a given set of related data (a "set of related data" also being referred to throughout this disclosure and accompanying claims as a "data set") is generally determined by some characteristic or group of characteristics associated with the data set. For the purposes of this disclosure and the following claims, such characteristic or group of characteristics will be referred to as the "route determinant characteristic" for the respective data set. The present invention includes the step of detecting a data set having a route determinant characteristic that does not match, that is, is inconsistent with, the access route for the respective data set. Once such a mismatched data set is detected, the method includes specifying a different access route for the respective data set. This different access route matches or is consistent with the route determinant characteristic for the data set so that the data set will be accessed by the proper access route.

The preferred form of the invention is employed in a data storage system that utilizes a block access storage device or system for physically storing data, but maintains a file system with file abstractions for the respective data sets stored by the system so that each data set is represented by a "file." The data storage system provides alternatively a file system access route to the block access storage device or a direct block access route to the block access storage device and specifies which of these access routes are to be used for each respective file. In this preferred form of the invention, the access management method includes first detecting a file having a route determinant characteristic that is inconsistent with the respective access route, either the file system access route or the direct block access route, specified for the file.

Once the mismatched file is detected, the method includes specifying a different access route for the file so that the access route specified for the file will be consistent with the route determinant characteristic for the file.

The invention further includes a program product for managing data access routes in a data storage system providing alternate data access routes to the system storage device or devices. The program product includes mismatch detection program code for detecting a data set having a route determinant characteristic that does not match the access route specified for the data set. Access route altering program code specifies a different access route for the data set so that the access route for the data set is consistent with the set's respective route determinant characteristic.

These and other advantages and features of the invention will be apparent from the following description of the preferred embodiments, considered along with the accompanying drawings.

DETAILED DESCRIPTION OF THE PREFERRED EMBODIMENTS

FIGS. 1 through 7 are referenced here to describe the structure and operation of a data storage system 100 that provides multiple data access routes. This example data storage system 100 utilizes block access storage devices 103 to actually store data, but maintains file abstractions for the stored data or data sets, and thus retains the important benefits associated with file systems. Data storage system 100 provides two alternative access routes for stored data sets or files, a file system access route and a direct block access route. File system operation access requests that invoke the direct block access route may be referred to as "divertible operations," whereas file system operation access requests that invoke the file system access route may be referred to as "non divertible operations." The dual access routes in data storage system 100 may be managed according to methods embodying the principles of the present invention. This route management process will be described with reference to FIGS. 8 through 11.

The following disclosure will refer for convenience to the particular data storage system 100 illustrated through FIGS. 1 through 7. Thus, the access route management method according to the invention will be described with reference to two alternate data access routes and specifically to a file system access route and a direct block access route. Also, the data sets stored in the system will be referred to as "files." However, it should be borne in mind that the invention is not limited to use with the specific data storage system 100 shown in the figures or to data storage systems that maintain file abstractions. The invention is also not limited to data storage systems which provide only two different access routes.

Figure 1:
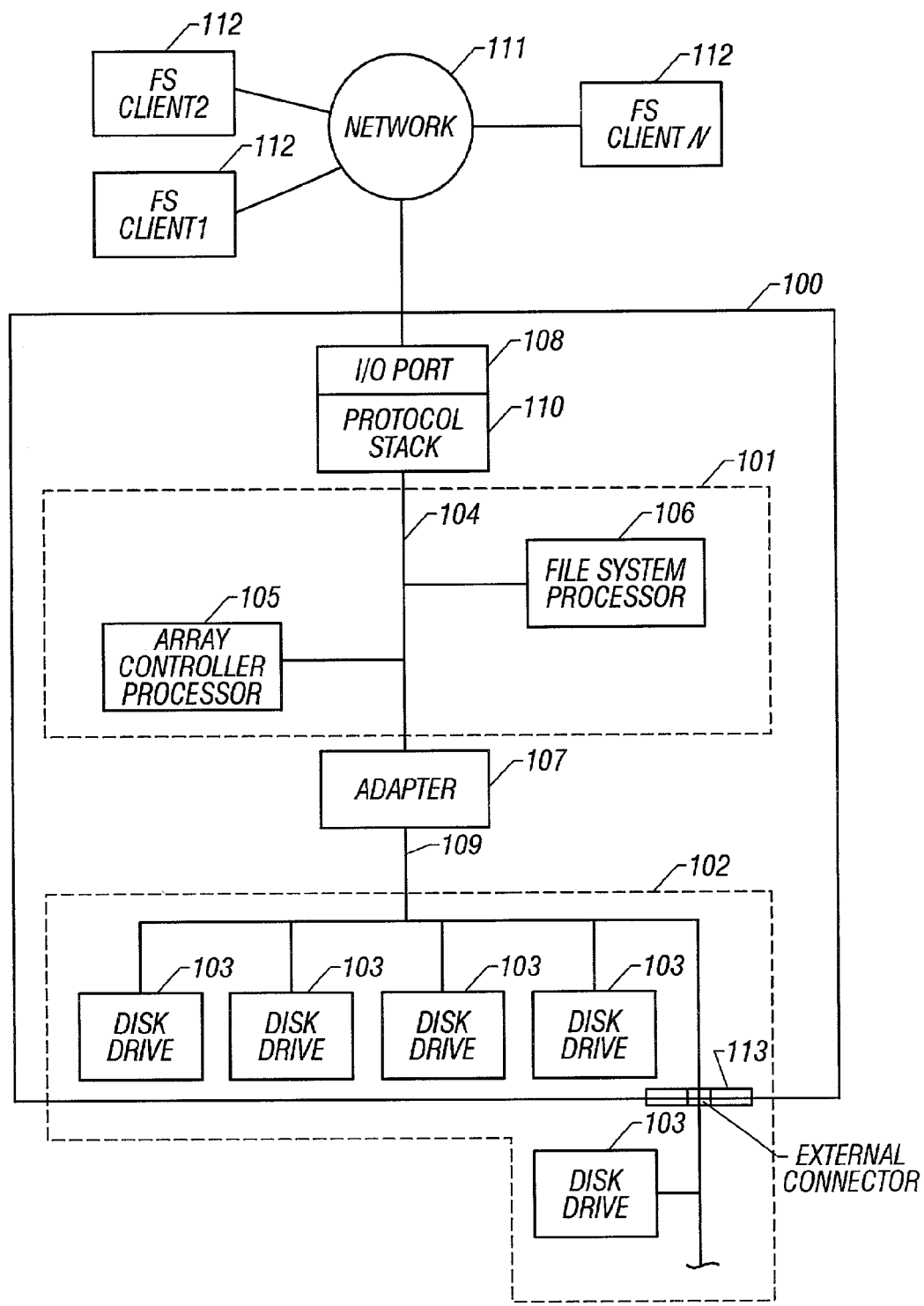
FIG. 1 is a diagrammatic representation of a data storage system providing alternate data access routes which may be managed according to the present invention.

Referring to FIG. 1, data storage system 100 includes a data processing arrangement 101 and an array 102 of separate storage devices 103. In the form of the invention shown in FIG. 1, data processing arrangement 101 includes two separate processors, an array controller processor 105 and a file system processor 106. A system bus 104 interconnects the two processors 105 and 106, a storage device adapter 107, and an input/output port 108. The separate adapter 107 shown in FIG. 1 provides an interface to the storage device bus 109. Also, a hardware protocol stack 110 is associated with the input/output port 108 for providing network communication services which allow system 100 to communicate with a computer network 111. Computer network 111 includes one or more file system clients 112 that have file system access to data storage system 100. These file system clients 112 represent separate computing devices such as personal computers or workstations on network 111.

Individual storage devices 103 shown in FIG. 1 preferably comprise disk drives or other suitable mass storage devices. Although not shown in FIG. 1, it will be appreciated that these storage devices 103 each include an interface connector and a drive controller. The interface connector allows the respective device to be connected to storage device bus 109, and the drive controller comprises a processing element for executing program code to control the operation of the particular storage device.

The illustrated storage system 100 may be housed in an enclosure (not shown) housing data processing arrangement 101, input/output port 108 and protocol stack hardware 110, storage device interface adapter 107, and one or more storage devices 103. The illustrated storage device bus 109 includes an external connector 113 for connecting additional storage devices external to the system enclosure.

The particular structure of the storage system 100 illustrated in FIG. 1 is shown only as one preferred form of a multiple access route data storage system in which access routes may be managed according to the present invention. Many variations on the structure are possible within the scope of the invention. For example, although two separate data processing devices 105 and 106 are shown in FIG. 1, it will be appreciated that all of the data processing functions required in a multiple access route data storage system may be performed on a single data processing device or may be divided between more than two data processing devices. Also, the functions provided by storage device interface adapter 107 shown in FIG. 1 may be performed by a processing device included in processing arrangement 101. The functions provided by protocol stack 110 shown in FIG.

1 may likewise be performed by some other processing arrangement in the system. Furthermore, although one external storage device 103 and four internal storage devices 103 are shown for purposes of example in FIG. 1, the invention may be employed with data storage systems including any number of storage devices. Storage devices 103 may, for example, comprise SCSI devices in which case bus 109 would comprise a SCSI bus, and adapter 107 would comprise a SCSI adapter. System bus 104 may comprise any suitable bus standard such as PCI for example.

Those skilled in the art will also appreciate that it is possible to implement a multiple access route data storage system equivalent to that shown in FIG. 1 in connection with a host computer rather than as the illustrated stand alone network unit. In this alternate implementation, the array controller processor and storage device adapter may be implemented on an add-on card such as a PCI card to be connected on the PCI bus of a host computer and the storage devices could all be external to the host computer. The processes performed by the file system processor 106 in FIG. 1 would be performed by a processor of the host computer in this alternate form of data storage system, and the host computer's input/output port and protocol stack could be employed for network communications.

Figure 2:
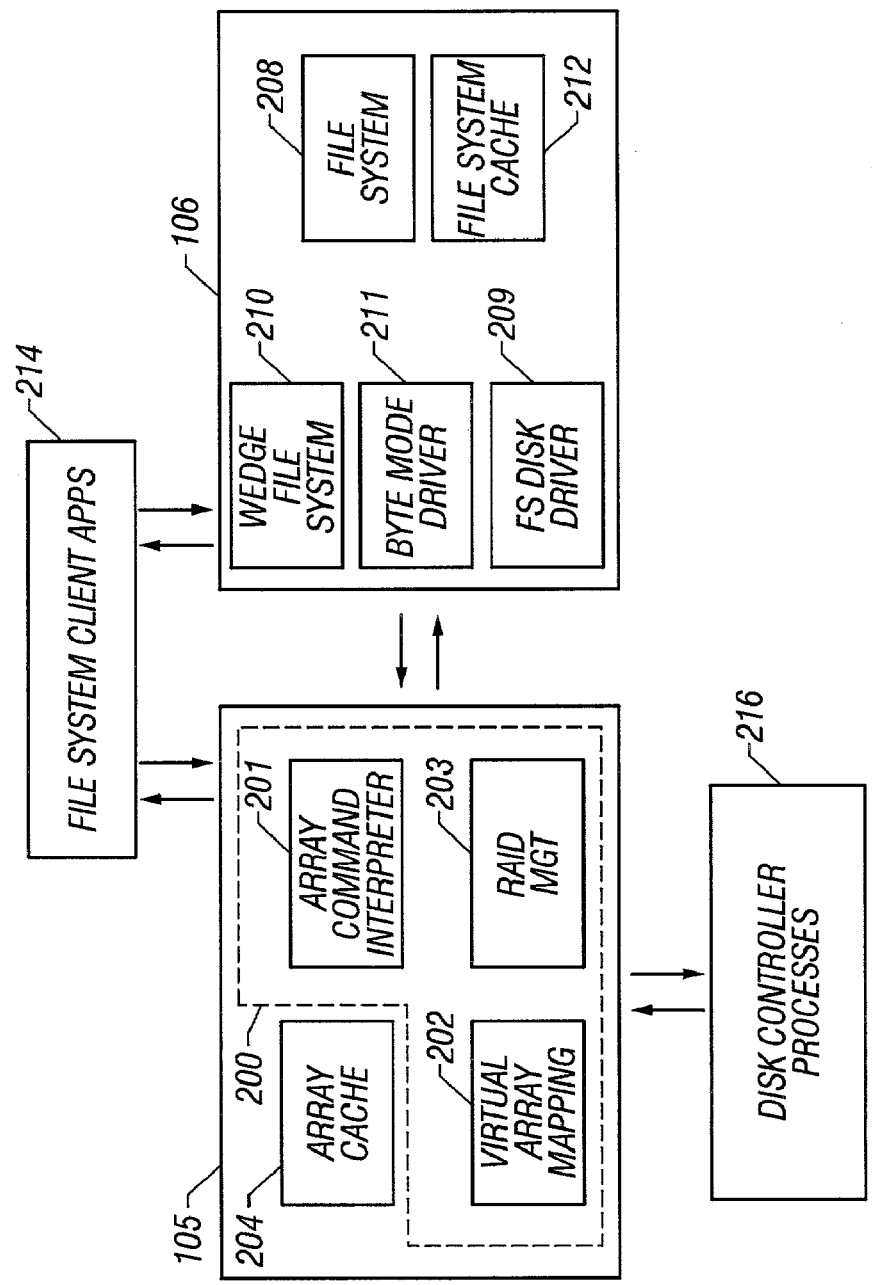
FIG. 2 is a diagrammatic representation showing groupings of various software processes which operate in the data storage system shown in FIG. 1.

FIG. 2 shows further detail of the program processes performed by data processing arrangement 101 under the control of computer program code according to the invention. Array controller processor 105 performs or executes a number of program processes each indicated in a separate box included in the box 200 in FIG. 2. These array controller program processes are implemented through array controller program code and are referred to in this disclosure collectively as array controller processes 200. In the illustrated form of the invention, array controller processes 200 include an array command interpreter 201, virtual array mapping component 202, and RAID management component 203. These elements each represent computer program code executed by the array controller processor 105 to perform various array controller functions. FIG. 2 also shows an array cache 204 associated with array controller processor 105. This array cache may comprise random access memory associated with the array controller processor or may comprise battery-backed random access memory. The memory is used to cache data being transferred to and from the storage devices under control of array controller processes 200.

Figure 6:
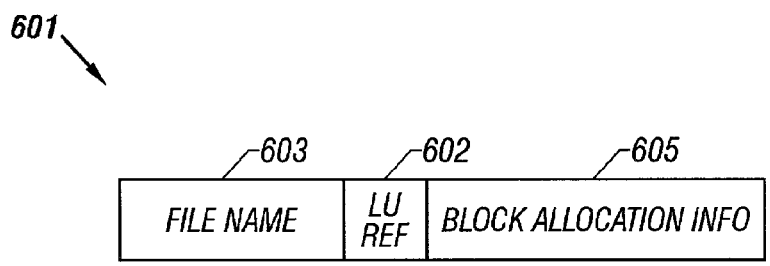
FIG. 6 is a representation of an entry in an array controller data management arrangement embodying the principles of the invention.

Array command interpreter 201 shown in FIG. 2 is responsible for receiving a data storage device-related command and converting the command to instructions or calls for the other array controller processes. In the preferred form of the invention, array command interpreter 201 also includes byte access conversion program code for converting the byte offset access instruction resulting from a divertible operation to a block access instruction, as will be discussed further below. Virtual array mapping component 202 provides an array data management arrangement which relates data stored on the storage devices to logical units and to blocks of storage space. An entry in this array data management arrangement is shown in FIG. 6 described below. Virtual mapping component 202 is also preferably responsible for creating and assigning logical units for the data to be stored across the device array 102. RAID management component 203 is responsible for managing the storage device array 102 and for communications with the virtual array mapping component. RAID component 203 also implements any data storage redundancy schemes or RAID schemes supported by data storage system 100. Array controller processes are well known in the art of disk arrays and RAID systems and will not be described further here so as not to obscure the present invention in unnecessary detail.

File system processor 106 shown in FIGS. 1 and 2 performs or executes a number of program processes, each implemented through computer program code. Each process is indicated in a separate box included in box 106 shown in FIG. 2. In addition to the file system processes or file system 208 implemented through file system program code, file system processor 106 executes a disk driver component 209, a wedge file system component 210, and a byte mode driver component 211. Each of these components represents program processes implemented by computer program code executed by file system processor 106. FIG. 2 also shows a file system cache 212 which comprises random access memory associated with file system processor 106. File system cache 212 provides storage space for caching file data being communicated ultimately to and from data storage devices 103 shown in FIG. 1.

It will be appreciated that the file system processes shown at block 208 in FIG. 2 include all program processes required for implementing the desired file system. In particular, file system processes 208 provide a file system data management arrangement. The file system data management arrangement includes one or more data tables which relate each file in the file system to various file attributes. Also, as will be discussed further below with particular reference to FIG. 5, the file system data management tables relate each file to either storage device allocation information or a reference to a logical unit created and managed by array controller processes 200. For communications to the array controller processes 200, file system processes 208 rely on disk driver component 209. This disk driver component 209 includes computer program code for communicating file system data access commands from the file system processes 208 to the array controller processes 200 to access certain file system data stored at the data storage devices 103. In particular, disk driver component 209 provides any necessary encoding of instructions and data communicated between the file system processes 208 and the array controller processes. It will be appreciated that the disk driver component may be considered as being included in the file system processes 208, but is shown separately in this disclosure to better describe its particular function.

As with most of the array controller processes 200, the specific implementations and operation of file system processes 208 and disk driver component 209 are within the ordinary skill in the art. Therefore, implementation and operational details will be described in this disclosure only as necessary to clearly and completely disclose the data storage system which may be managed according to the present invention.

Wedge file system component 210 implements special file system processes interposed between file system clients (112 in FIG. 1) and file system processes 208. As will be described in further detail with reference to FIGS. 3 and 4, wedge file system component 210 receives file system access operation requests from file system clients and determines whether the request includes a divertible operation. The determination is performed by operation detection program code included in the wedge file system. Wedge file system component 210 passes non divertible operations to file system processes 208. This processing of non divertible operations through file system processes 208 occurs just as in a prior art file system and represents the file system access route to the data storage devices 103 shown in FIG. 1. However, when wedge file system component 210 detects a divertible operation, it blocks the operation from reaching file system processes 208, and instead diverts the divertible operation to be processed by the array controller processes 200 executed at array controller processor 105. This direct execution of the divertible operation by array controller processes 200 facilitates direct block access to the storage devices 103 and represents an alternative data access route. Further details of the operation of wedge file system component 210 will be described below with reference to FIGS. 3 and 4.

Utilizing the wedge file system component 210 as shown in FIG. 2 to intercept file system access operation requests has the advantage that the operation detection function may be implemented without making changes to the program code implementing file system processes 208. However, it will be appreciated that the divertible operation detection function described above with reference to wedge file system component 210 may alternatively be provided by modifying file system processes 208. In this alternate implementation, divertible operations would reach file system processes 208 but would not be processed and instead be diverted to the alternate, direct block access route through array controller processes 200. This alternate implementation is to be considered an equivalent to the wedge file system component implementation set out in detail in this disclosure.

Byte mode driver component 211 comprises program code for conveying commands for a divertible access operation to array controller processes 200, and particularly to array command interpreter component 201. The conveyance functions performed by byte mode driver component 211 for divertible operations are analogous to the functions provided by disk driver component 209 with respect to non divertible operations.

As indicated in FIG. 2, the program processes performed at array controller processor 105 and file system processor 106 communicate with each other and also both communicate with file system client applications 214 comprising software executed at file system clients 112 in FIG. 1. Array controller processor 105 also communicates with disk controller processes 216. Disk controller processes 216 comprise program code executed at the controller (not shown) associated with each data storage device 103 in FIG. 1.

The method of providing multiple alternate access routes to stored data employed in data storage system 100 in FIG. 1 and the operation of the various program processes shown in FIG. 2 may be described with reference to FIGS. 3 and 4. As shown at process block 401 in FIG. 4, the method includes receiving a file system access operation request. This file system access operation request is received from a file system client 112 in FIGS. 1 and 3, through communications facilities provided by protocol stack 110 also shown in those figures. The access operation request is received by the wedge file system component 210 in the preferred form of the invention. As mentioned above, this wedge file system component 210 is interposed between the file system processes 208 and file system clients 112. A component referred to as a virtual file system interface may be used in certain file systems to insert file system modifications ahead of the file system components or to insert an additional or alternative file system. Thus, the file system processes 208 (FIGS. 2 and 3) employed according to the preferred form of the invention illustrated in the figures must support a virtual file system interface or other method for inserting wedge file system component 210. It will be appreciated that the virtual file system interface support is not required where the functions of the wedge file system are integrated with the file system itself.

The method next includes the step of determining whether the file system access operation request includes a divertible operation. This step is shown at decision block 402 in FIG. 4 and is performed by the wedge file system component 210 in the illustrated form of the invention. It will be assumed for purposes of this disclosure that file system access operations are generally defined as divertible or non divertible based on the size of the file (amount of data making up the file) which is the subject of the access operation request. That is, the route determinant characteristic associated with each file will be assumed for the purposes of this disclosure to be the size of the file. This diversion or specification of data access route based on file size has the effect of causing all files over the predetermined threshold size to be handled or processed directly by array controller processes 200 (the direct block access route) and causing all files below the threshold size to be handled or processed normally through file system processes 208 (the file system access route). The preferred form of the data storage device also includes a mechanism for overriding the normal rules for determining if an operation is a divertible operation. Again, although the invention is described here for purposes of example as using file size as the route determinant characteristic, other file attributes and other standards or combinations of attributes and standards may be used as route determinant characteristics within the scope of the accompanying claims.

Any suitable method may be used for making the determination at decision block 402. In the example that the determination is based on the size of the file which is the subject of the received operation, wedge file system component 210 may obtain file size information from the file system data management arrangement associated with file system processes 208. In a preferred form of the invention, when a file is opened the wedge file system obtains file size information for the file from the file system and stores that information in a suitable data structure associated with the wedge file system. Thus, the decision step at block 402 may include reading file size information from the wedge file system data structure. Alternatively, the decision step at block 402 may include sending a request for the necessary file size information from wedge file system component 210 to the file system processes 208. In some situations, however, it may be preferable or necessary for the wedge file system to obtain the necessary file size information from the incoming file access operation request, in which case the decision step at block 402 would include reading file size information from the incoming operation request. If file size information is not available for the file which is the subject of the incoming file access operation request, it may be necessary for wedge file system component 210 to be programmed to make an assumption as to the size of the file. It may alternatively be possible for wedge file system component 210 to obtain file size information from the file system client 112 issuing the request, although current file systems do not support such a function.

In the preferred data storage system described with reference to FIGS. 1 through 4, a special "access route" attribute may be associated with each file. In the present example in which the subject file size is used as the route determinant characteristic, the access route attribute may comprise a "file state" which may be set as either "large" or "small." This file state attribute may be stored in the file system data management arrangement implemented by file system processes 208 as described below with reference to FIG. 5. The step of determining if the operation is a divertible operation then comprises simply reading the file state attribute stored at the file system data management arrangement for the file which is the subject of the access operation.

Figure 4:
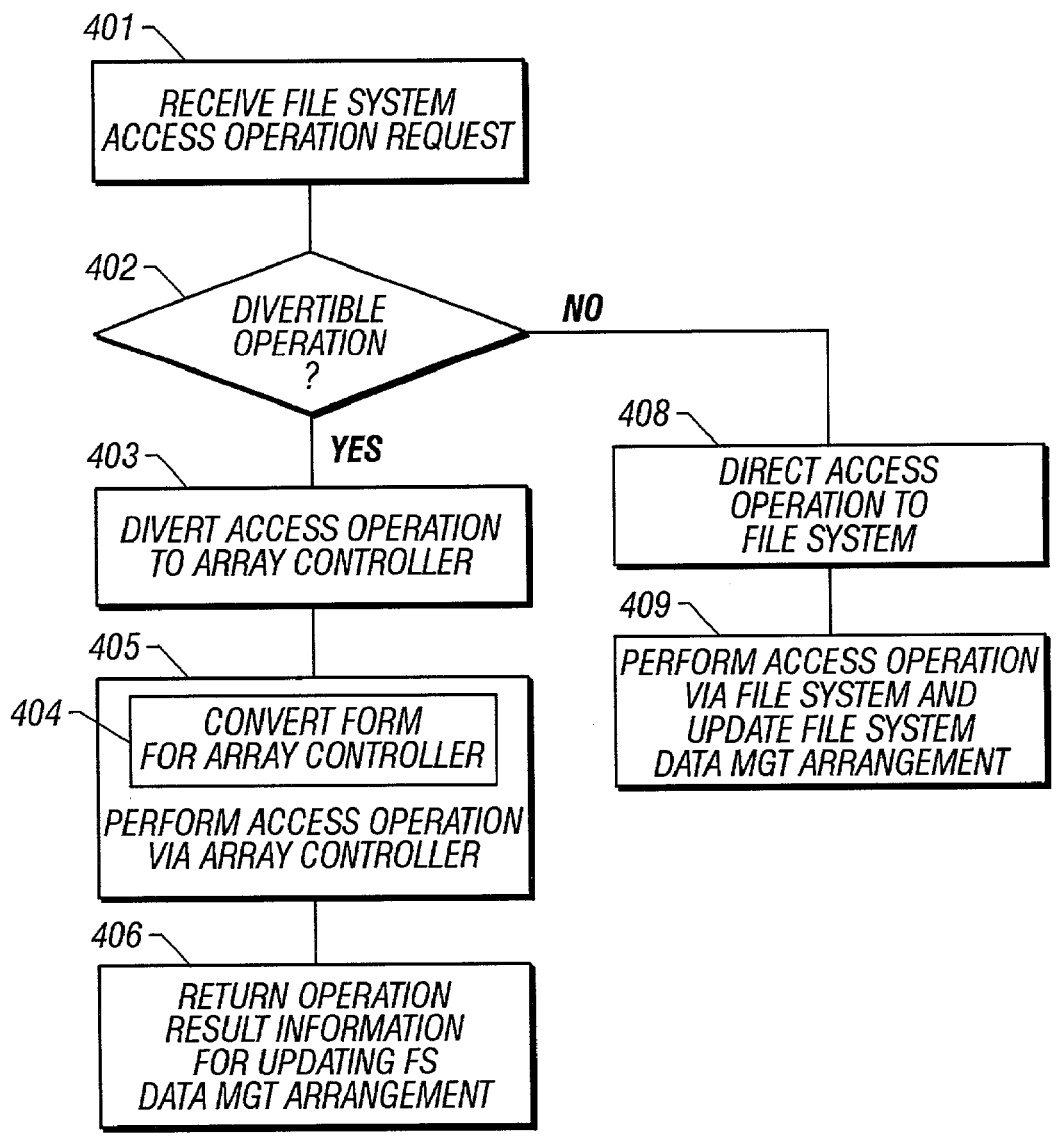
FIG. 4 is a flowchart showing the process steps performed according to a preferred form of the invention.

If the operation is determined to be a divertible operation, wedge file system 210 diverts the operation to array controller processes 200 as shown at process block 403 in FIG. 4. In the preferred form of the invention, the method also includes converting the diverted file system operation from a byte offset definition to a block access definition. This conversion step is shown at process block 404 in FIG. 4, and is preferably performed by program code included in or associated with array command interpreter 201 using memory available at array controller processor 105. It will be noted that a similar conversion is part of the normal operation of the file system processes 208. In each case, the conversion includes dividing byte offset and length data by the number of bytes in each block of storage space defined for storage devices 103. Blocks are commonly defined as 512 byte storage spaces, although the invention is not limited to this block size.

Once the diverted file system operation is converted to a block access form at array command interpreter 201, the operation is performed as shown at step 405 in FIG. 4. Performing the requested operation includes generally the normal steps in an array access. In particular, array command interpreter 201 takes the code or instruction representing the diverted operation and issues calls or commands to the associated processes depending upon the nature of the operation. For a read operation, the array mapping component 202 determines the block allocations associated with the pre-existing file to be read. The RAID management component 203 then issues an appropriate command to the device or devices 103 to read the data stored at the identified blocks. In a write operation, mapping component 202 maps the file data to blocks within the logical unit assigned to the file. RAID management component 203 then issues a command to the storage device or devices 103 to write the received data to the mapped blocks.

Figure 3:
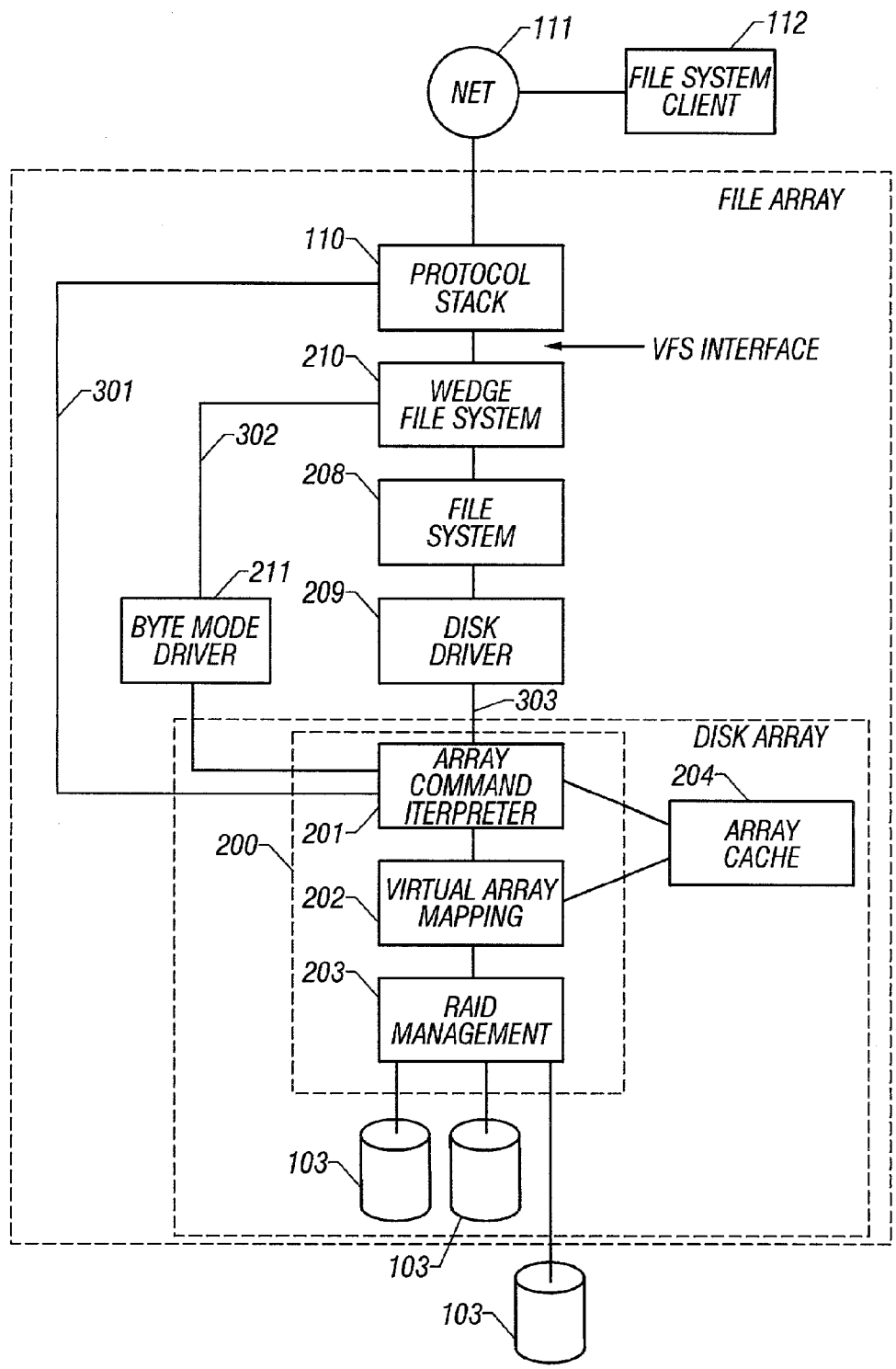
FIG. 3 is a diagrammatic representation showing the interactions between the various software processes shown in FIG. 2.

FIG. 3 shows three separate paths to array command interpreter 201. Path 301 runs from protocol stack 110 to interpreter 201. This path 301 is representative of the direct block access route in data storage system 100 and is shown to indicate that the file data associated with a divertible operation completely bypasses file system processes either passing to or from the storage devices 103. Path 302 shows a path between wedge file system component 210 and interpreter 201 to indicate that commands and receipts associated with divertible operations pass between these two processes. Path 303 between disk driver component 209 and array command interpreter 201 is representative of the alternate file system data access route in data storage system 100 and is shown in FIG. 3 to indicate that commands, receipts, and file data associated with a non divertible file system access operation pass between disk driver 209 and array command interpreter 201 as will be discussed further below.

As shown at process block 406 in FIG. 4, the method employed by the multiple access route data storage system 100 also includes the step of updating the file system data management arrangement with information about the results of the executed divertible access operation. Since the invention maintains the desired file hierarchy through the file system data management arrangement, the tables making up the arrangement must be updated in order to maintain the correct information regarding the file which is the subject of a divertible access operation executed directly through array controller processes 200. Array controller processes 200 facilitate this update of the file system data management arrangement by communicating operation result information to the file system processes 208. The nature of the operation result information depends upon the nature of the divertible access operation which has been performed. For a create operation diverted to and performed by array controller processes 200, the result information includes a reference to a logical unit assigned for the file by the array controller processes, particularly the array mapping component 202. For a divertible read or write operation, the operation result information may comprise a receipt or message indicating the completion of the particular operation. In any event, the operation result information may be communicated directly back to file system processes 208 or communicated through wedge file system component 210.

Returning to decision block 402, if the access operation request is determined to include an operation which is not a divertible operation, wedge file system component 210 passes the operation directly to file system processes 208 as indicated at process block 408. File system processes 208 then perform the operation at block 409 as in traditional file systems.

It will be noted that according to the preferred form of the invention, a single logical unit of the disk array implementation is devoted for storing small files which are processed or accessed through file system processes 208 in the normal fashion. However, all large files (in this example where file size determines the class of divertible operations) are processed or accessed directly through array controller processes as indicated by path 301 in FIG. 3 and are preferably each allocated their logical unit by array controller processes 200. This difference between large file storage and small file storage means that the available storage space in array 102 is divided into space for large files and space for small files. The space available for larger files may be referred to as one route accessible space while the space available for small files may be referred to as a separate route accessible space. Thus, where the access route changes for a particular data set, the data set must necessarily be relocated from one route accessible space to another.

Figure 5:
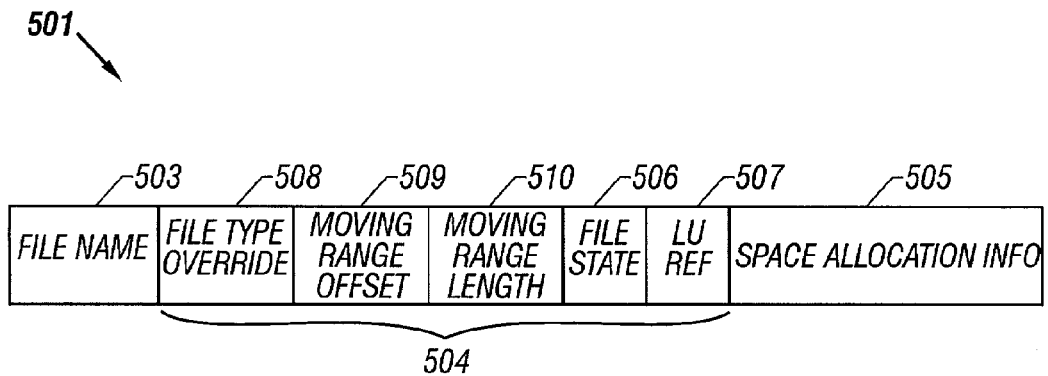
FIG. 5 is a representation of an entry in the file system data management arrangement embodying the principles of the invention.

FIGS. 5 and 6 illustrate portions of the data management arrangements used by the file system processes 208 and array controller processes 200, respectively. Referring first to FIG. 5, a file system data management entry is shown at 501. In this preferred form of the invention, each entry includes a file name field 503, a group 504 of file attribute fields, and a field 505 containing information regarding file system storage space allocation. Within group 504, attribute field 506 stores a file state attribute. This file state attribute defines the file as either small, large, shrinking, or growing. Attribute field 507 provides a location for storing a reference to a logical unit to which the subject file is stored. Attribute group 504 further includes file type override field 508, a moving range offset field 509, and a moving range length field 510. File type override field 508 is preferably included in entry 501 to facilitate forcing treatment of the subject file as either large or small file, that is, forcing a particular data access route for the file, regardless of the actual route determinant characteristic for the file. Attribute fields 509 and 510 are used in the preferred form of the present invention in physically moving data for purposes of changing data access routes as will be discussed further below.

It will be appreciated that for small files (or files treated as small files as dictated by a value in field 508) there is no value in logical unit attribute field 507 because array controller processes 200 do not directly manage small files and do not assign small files their own logical unit. Rather, small files are handled by file system processes 208. File system processes 208 allocate storage space for the file within a single logical unit assigned for the file system by array controller processes 200. This allocation information is stored in field 505 for a small file. In contrast, file system space allocation field 505 is preferably left blank in a large file entry, while logical unit reference attribute field 507 stores the reference to the logical unit at which the large file is stored through the array controller processes 200. Space allocation field 505 may be left blank for a large file because storage space is allocated for the file and managed by the array controller processes 200.

It will be noted that the attributes in group 504 are each comprised of externally defined attributes and are not attributes normally defined in a file system. Thus, the file system must support externally defined file attributes in order to implement this preferred form of the invention. Most modern file systems do support such externally defined file attributes.

Referring to FIG. 6, the data management arrangement for array controller processes 200 includes an entry 601 for each file which is handled directly by the array controller processes according to the invention. In other words, an entry 601 is created for each file subject to a divertible operation and for which the direct block access route is specified. Each entry 601 includes a logical unit reference field 602 and a file name field 603. Logical unit reference field 602 stores a reference to a logical unit at which the particular file is stored. File name field 603 stores the file name associated with the file for which the entry 601 is made. Entry 601 further includes field 605 containing storage space or block allocation information indicating the blocks of storage space allocated for the respective file.

Figure 7:
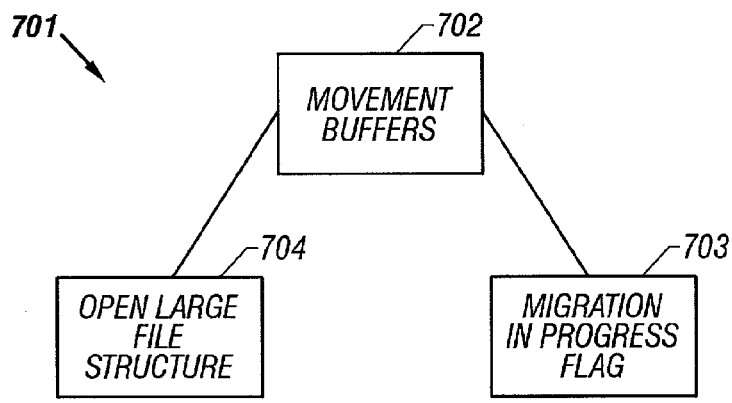
FIG. 7 is a diagrammatic representation of the wedge file system data structures employed in a preferred form of the invention.

FIG. 7 illustrates a data structure 701 implemented in the preferred wedge file system 210. This preferred data structure includes movement buffers 702, a migration in progress field 703, and an open large file structure. Movement buffers 702 represent buffer storage space used in transferring data in order to specify a different data access route for a file or data set according to one form of the present invention. Migration in progress field 703 comprises a field for storing a value indicating that data is in the process of being transferred to specify a different data access route for the data. Both the movement buffers 702 and field 703 will be discussed further below with reference to the transfer of data occasioned by a change in the data access routes for particular data.

Open large file structure 704 is created by program code included in wedge file system 210 and comprises a temporary data structure for files that may be the subject of divertible operations, and thus accessed through the direct block access route. This wedge file system temporary file structure helps accelerate the processing of a divertible operation for a specified file by having required access information for the specified file readily available at the time the divertible operation is received. The structure is analogous to a similar temporary data structure commonly utilized in file systems. Each record in open large file structure 704 preferably includes a file handle, the file name, and a logical unit identifier. The logical unit identifier comprises an identifier for the logical unit to which the respective file has been stored according to a divertible operation, accessed by direct block access.

The method and program product for managing access routes according to the present invention will now be described with reference to FIGS. 8 through 11. The method will be described as applied to the exemplary multiple data access route data storage system 100 described with reference to FIGS. 1 through 7. Thus, the following description will continue with the terminology of the exemplary system which maintains file abstractions for the stored data and provides alternatively a file system access route and a direct block access route to data storage devices.

The route determinant characteristics for a file may change over time so that the access route for a particular file is inconsistent with the route determinant characteristics for the file. For example, where the route determinant characteristic comprises file size, a file that once qualified as a small file might have sufficient data added to qualify as a large file. Conversely, data may be deleted from a large file to the extent that the resulting file qualifies as a small file. In these instances there is a mismatch between the route determinant characteristics for the file and the earlier access route specified for the file. That is, the once small file may still be accessed through the small file access route even though the file currently qualifies as a large file which should be accessed through the large file access route. Similarly, a once large file may still be accessed through the large file access route even though the file is currently a small file and should be accessed through that access route. These incorrect access routes may defeat the purpose for the multiple access route arrangement and reduce system performance.

Figure 8:
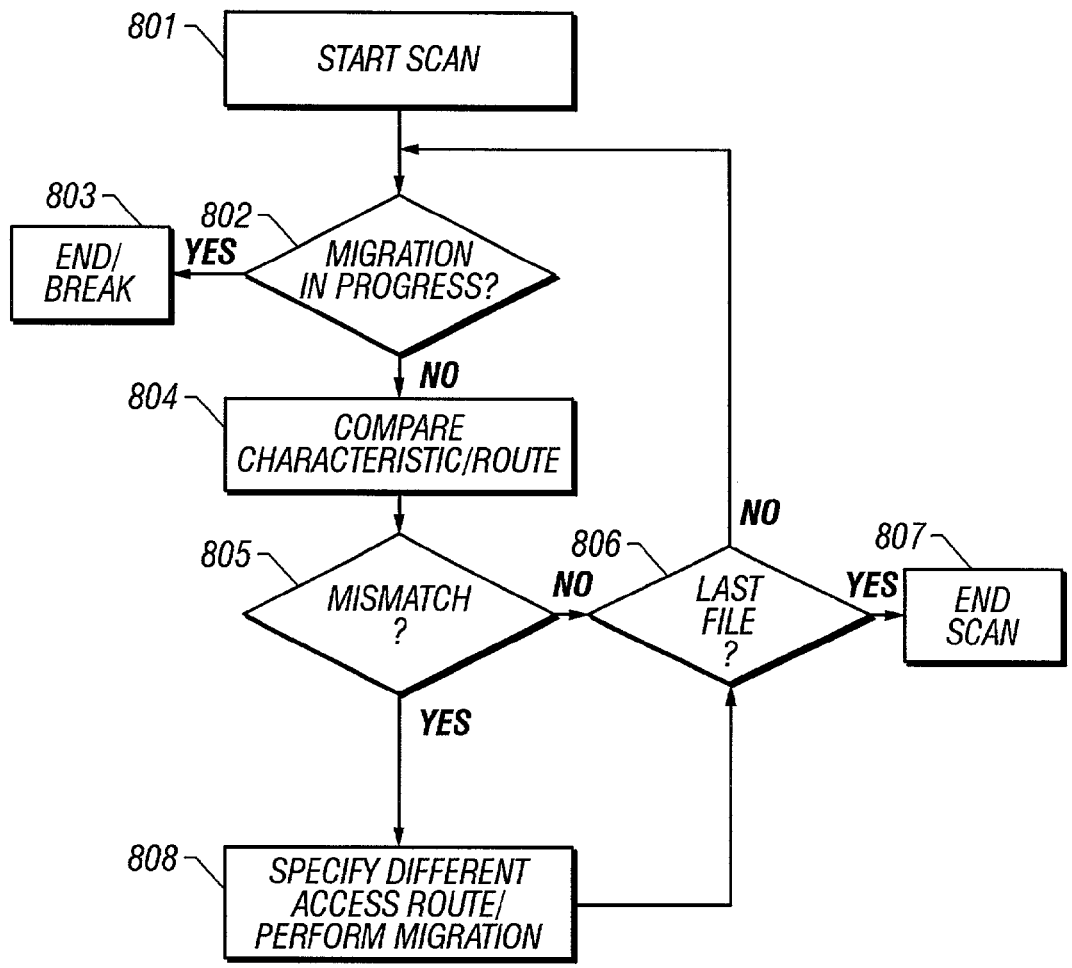
FIG. 8 is a flow chart showing process steps according to one preferred form of the invention.
Figure 9:
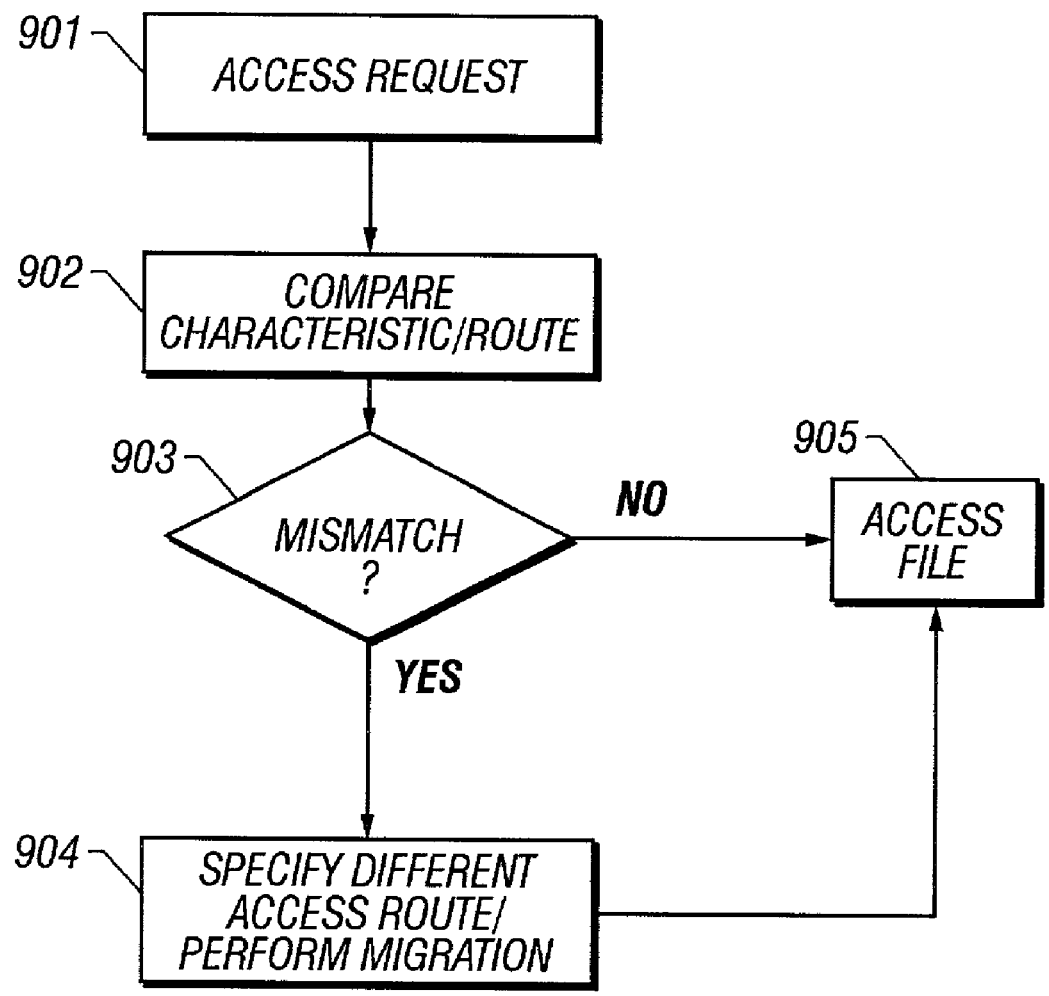
FIG. 9 is a flow chart showing an alternative process according to the invention.

FIGS. 8 and 9 show two alternative processes for effecting a change in data access routes in a data storage system providing multiple data access routes. In each case, the method involves generally detecting a file having a route determinant characteristic that is inconsistent with the data access route specified for the file. Once the mismatch between the route determinant characteristic and specified access route for the file is detected, the method includes specifying a different access route for the file to eliminate the mismatch. In the preferred form of the invention, the step of specifying a different access route for a particular file includes actually transferring data from one route accessible space within the data storage system to another, as will be discussed in detail below. This process of transferring data to accommodate an access route change may be referred to as migration.

Referring to FIG. 8, one preferred form of the invention includes scanning one or more files periodically to detect access route mismatches. The scanning steps are performed generally by mismatch detection program code which may be included in the wedge file system 210. The scan for mismatched files may be started as shown at process block 801 periodically at fixed time intervals or according to any other periodic trigger. Regardless of how the periodic scan is triggered, the process includes first determining if a migration is in progress as indicated at decision block 802. This determination may be made by checking the migration in progress flag 703 in the wedge file system data structure (FIG. 7). If a migration is in progress, the scanning process may simply end as indicated at block 803. If multiple migrations are supported or if no migration is in progress, the process then includes determining if the specified access route for a selected file matches or is consistent with the route determinant characteristic for that file as shown at process block 804. The step at process block 804 is performed by comparison program code which is one part of the mismatch detection program code. This comparison may be performed in a two step process in the example arrangement in which file size comprises the route determinant characteristic. The first step comprises comparing actual file size of the file to a threshold file size above which a file is considered a large file. The second step comprises comparing what the file state should be as indicated by the result of the first step with the file state attribute (506 in FIG. 5) currently stored for the file.

If no mismatch is detected as indicated at decision block 805 in FIG. 8, the process proceeds to decision block 806 to determine if there are other files to scan for a mismatch. If there are other files to scan for a mismatch, the process returns to process block 804 to perform the comparison on the next file available for scanning. Otherwise, if no more files are available for scanning, the scanning process ends as shown at process block 807. If a mismatch for a file is detected at decision block 805, the process proceeds to the step of specifying a different access route for the file and relocating or migrating data for the file from one route accessible space to another. This step is shown at process block 808 in FIG. 8 and is performed by access route altering program code preferably part of the wedge file system 210. One preferred form of this access route altering step will be discussed below with reference to FIG. 10. After the access route altering step is started or completed, the process returns to process block 804 if further files are available for scanning or terminates if no further files are available for scanning.

It should be noted that the invention encompasses different arrangements for situations in which mismatches are found for multiple files. In one form of the invention, once the process of data migration is in progress, no additional access route alteration/data migration procedures may be initiated until the earlier initiated migration is complete. Alternatively, access route alteration/data migration for different files may be performed simultaneously where there is sufficient buffer space available to accommodate the data transfers.

In the alternate process shown in FIG. 9, mismatch detection performed by the mismatch detection program code is triggered only for a particular file in response to an access request for the file at process block 901. This is in contrast to the periodic scanning of one or more files described with reference to FIG. 8. In response to the access request for the file, the method includes comparing the route determinant characteristic for the subject file with the route currently specified for the file as shown at process block 902. This comparison may be performed as described with reference to process block 804 in FIG. 8 with a similar program code component. If no mismatch is indicated, the file is simply accessed in the normal fashion as indicated at process block 905. However, if the comparison detects a mismatch as indicated at decision block 903, the process proceeds to the step of specifying a different access route for the file as shown at block 904, performed by access route altering program code. Once the different access route has been specified for the file and the data for the file has been migrated to the different route accessible space, the file is accessed as shown at process block 905. It should be noted that the process may alternatively include accessing the specified file prior to changing the access route has opposed to the sequence shown for purposes of example in FIG. 9.

Figure 10:
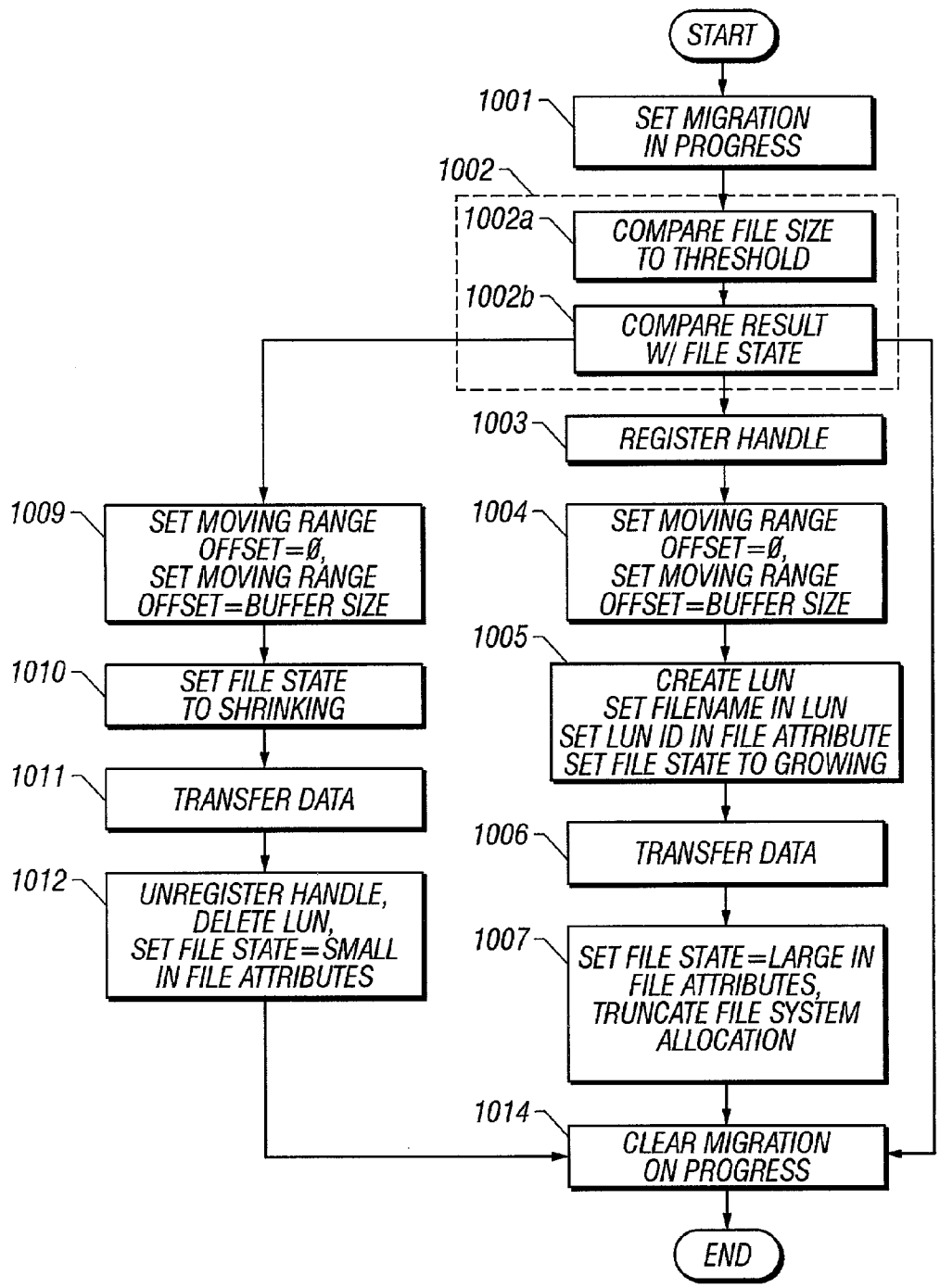
FIG. 10 is a flow chart showing process steps for specifying a different access route according to one form of the invention.
Figure 11:
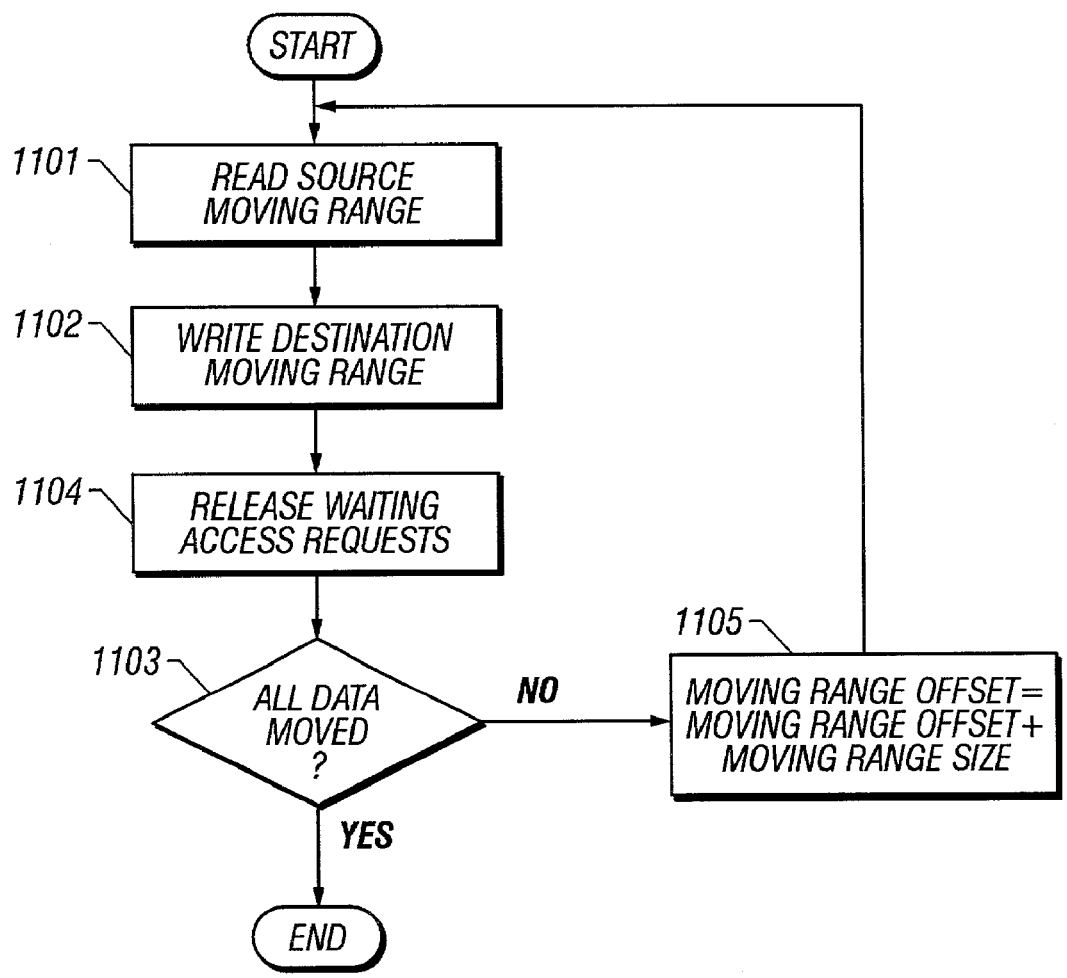
FIG. 11 is a flow chart showing one preferred process for transferring data for a file pursuant to a change in access route.

FIGS. 10 and 11 illustrate a process for changing the access route for a file as required at process block 808 in FIG. 8 and 904 in FIG. 9. Referring to FIG. 10, the process includes first setting the migration in progress flag in the wedge file system data structure (703 in FIG. 7). This step of setting the migration in progress flag is shown at process block 1001 in FIG. 10.

In the form of the invention in which the data access route for a file is determined by the size of the file, a change in access route will occur in only two situations. One situation is where the file is treated as a small file but has had sufficient data added to fall under the definition of a large file. In this situation the file may be referred to as "growing" in the sense that it has grown from a small to large file. The only other situation warranting a change in data access route in this example based on file size is where a large file has had sufficient data deleted to qualify as a small file for data access purposes. A file in this situation may be referred to as "shrinking" in the sense that it has been reduced from a large file to a small file. If a file is undergoing a change in data access routes in this example, it will either be a growing file or a shrinking file.

The determination of whether the file is growing or shrinking is made at block 1002 which encompasses blocks 1002a and 1002b. At block 1002a the file size is compared to the threshold size that marks the boundary between different access routes for files in this example. This step determines whether the actual file size is greater than or less than the threshold size and thus whether the file should be treated as a large file or a small file. At block 1002b the result of the comparison at 1002a (the file is actually a large/small file) is compared with the current file state attribute. There are three possible outcomes of the comparison at block 1002b. One possibility is that the file is a large file but the file state attribute for the file indicates that the file is currently treated as a small file. In this case, the process in FIG. 10 proceeds to process block 1003. Another possibility is that the file is a small file as indicated at 1002a, but the file state attribute for the file indicates that the file is currently treated as a large file. In this case, the process goes to block 1009. The third possibility is that the manner in which the file should be treated as indicated at block 1002a is now consistent with the treatment indicated by the current file state attribute for the file. If this is the case, the process branches to block 1014 in FIG. 10.

If the file for which the access route is being changed is growing as indicated by the comparisons at block 1002, the illustrated method includes registering a handle for the file in the open large file structure shown at 704 in FIG. 7. This step is shown at process block 1003 in FIG. 10. The process also includes setting the moving range offset to zero in field 509 shown in FIG. 5, and setting the moving range size to the buffer size as indicated at process block 1004. The buffer size referred to here is the buffer size of the movement buffers 702 included in the wedge file system structure illustrated in FIG. 7. These steps reflect the fact that the file being transferred must be transferred in segments no larger than the available buffer size as will be discussed further below.

Since the file is growing from small file treatment to large file treatment, several steps must be taken by the array controller processes 200 and file system processes 208 shown in FIG. 2 in order to accommodate the change. These steps are grouped together and shown at process block 1005 in FIG. 10. The array controller processes must create LUN for the growing file along with an entry in the data management arrangement for the array controller processes (entry 601 in FIG. 6). Creating the entry requires setting the file name at field 603 in FIG. 6, and setting the LUN reference in field 602 and in field 507 for the file system entry 501 for the file shown in FIG. 5. The array controller processes 200 also set the block allocation information for the entry (field 605 in FIG. 6) while the file system processes modify the file system entry for the file by setting the file state attribute (in field 506 in FIG. 5) to growing.

The data for the file is actually transferred or migrated at process block 1006 in FIG. 10. This data transfer step will be described further with reference to FIG. 11 and is performed by data transfer program code included in the route altering program code. Once the data for the growing file is transferred, the process includes setting the file state to large in the appropriate field in both the file system entry for the file (501 in FIG. 5) and the array controller entry for the file (601 in FIG. 6). This step is shown at process block 1007 in FIG. 10 along with the step of truncating the file system allocation information. It will be noted that the steps shown at process block 1007 are the same as those that occur when a large file is initially stored in data storage system 100.

Referring back to block 1002, if the file is shrinking, that is, moving from a large file status to small file status, the preferred data transfer process includes setting the moving range offset and moving range size as shown at process block 1009. These steps are similar to the steps performed at process block 1004 in connection with the changing access route for a growing file. As shown at process block 1010, the method for a shrinking file also includes setting the file state to "shrinking." The file system processes (208 in FIG. 2) perform this step by setting the field 506 for the file system entry 501 for the respective file. The data making up the file is then transferred as shown at process block 1011 similarly to the transfer at process block 1006 for a growing file. As indicated at process block 1012 in FIG. 10, once the data for the file is transferred, the array controller processes 200 delete the LUN formerly assigned to the formerly large file, while the wedge file system unregisters the handle for the file in the open large file structure (704 in FIG. 7). Also, the file system processes set the file state for the file to indicate the file is now a small file. This file state is recorded at field 506 in the file system entry 501 for the file as illustrated in FIG. 5.

Regardless of whether the transfer of data is for a growing or shrinking file, the transfer process ends with clearing the migration in progress flag, which was set at the beginning of the route changing process as shown at process block 1001. With the migration in progress flag cleared, the system is once again available for changing the access route associated with a file in the system.

FIG. 11 illustrates the preferred process for transferring data for a file for the purpose of changing the data access route for the file. The process includes reading the source moving range set for the file as shown at process block 1101 and writing the destination moving range at process block 1102. The source moving range refers to the source or current location of the data to be moved. This location will be within one route accessible space in the array 102. The data at this source location is first read from the source location and buffered in the buffer memory (702 in FIG. 7) and then written to the destination location comprising the location at which the file may be accessed through the new access route. This new location will be in a different route accessible space associated with the new access route for the data. It will be recalled that the moving range offset has previously been set to zero as indicated at process block 1004 or 1009 in FIG. 10. This causes the read operation at block 1101 in FIG. 11 to read the first segment of data for the file in the initial read at block 1101. It will also be noted that the moving range size has similarly been preset to the buffer size, that is, the size of the movement buffer 702 shown in FIG. 7. Thus, the read operation indicated at process block 1101 reads as much of the file as is possible considering the movement buffer limitation. At this point, the process includes releasing any waiting file access requests which have been delayed while the data was being transferred. This releasing step is shown at process block 1104 in FIG. 11. In the preferred form of the invention, a file access operation request that collides with a moving range is delayed using access delaying program code and not executed until the collision and condition has cleared. The system checks for collisions with a moving range in connection with each access request from a file system client (112 in FIG. 1) and holds the request in a queue until released as indicated at 1104.

Depending upon the amount of data to be moved and the movement buffer size associated with the wedge file system structure 701 shown in FIG. 7, it may be necessary to repeat the steps at process blocks 1101 and 1102 two or more times. If all of the data for the file has not been moved as indicated by the outcome at decision block 1103, the process moves to process block 1105. At this step, the moving range offset is set equal to the current moving range offset plus the moving range size which has just been moved. This modification to the moving range offset has the effect of moving over to the next segment of data after the segment which has just been moved. The process then returns to process blocks 1101 and 1102, at which point this next segment of data for the file is read from the source location and is written to the destination location.

It will be noted that it is possible for there to be a file access in tight sequence with a migration of data for a file from one route accessible space to another. In order to ensure that file accesses and migrations handle the correct data, the order of commands issued from wedge file system 210 in FIG. 2 must be retained in all processes downstream from the wedge file system, that is, below the wedge file system as shown in FIG. 2.

It should also be noted that the option to override the normal route determinant characteristic of a file may also require a transfer of data depending upon when the override option is allowed. If the override attribute shown at field 508 in FIG. 5 may be set after the file is created, specifying the override attribute oppositely to the current file state attribute trigger a change in the access route for the respective file. For example, if a given file is classified as a small file and then the override attribute is set as a large file, the data access route will be changed from the file system access route to the direct block access route. This change may be accomplished by the same process steps described in FIGS. 10 and 11.

It will be appreciated that the arrangement for managing data access routes according to the present invention will also preferably account for the possibility of interruptions in the migration of data from one route accessible space to another. Such an interruption might occur where power to the system fails for a period of time. The preferred manner of accommodating such an interruption is to simply abort any migration that was in progress at the time of the interruption and was therefore unable to complete due to the interruption. Other accommodations for process interruptions might maintain migration state information in order to resume migration at the appropriate point once the interruption has passed.

The above described preferred embodiments are intended to illustrate the principles of the invention, but not to limit the scope of the invention. Various other embodiments and modifications to these preferred embodiments may be made by those skilled in the art without departing from the scope of the following claims. In particular, the various program processes may be distributed across processing devices in any suitable fashion to perform the desired functions within the scope of the invention and the following claims. Also, the various software components shown in the figures are shown and described only for purposes of example and are divided generally in a fashion which most clearly describes the invention. However, the various software functions may be performed by differently named and arranged software components. These different software arrangements are to be considered equivalent to the arrangement set out in the present disclosure and the accompanying claims.

What is claimed is:

1. A method for managing data access routes in a data storage system that provides alternative data access routes to a data storage device, the method including the steps of:
   (a) detecting a first data set having a route determinant characteristic that is inconsistent with a data access route specified for the first data set; and
   (b) specifying a different data access route for the first data set, the different data access route matching the route determinant characteristic for the first data set, wherein specifying the different data access route for the first data set includes storing an indication of the different access for the first data set.

2. The method of claim 1 further including the step of performing a comparison operation at predetermined time intervals and wherein the step of detecting the first data set having the route determinant characteristic that is inconsistent with the data access route specified for the first data set is accomplished in the comparison operation.

3. The method of claim 1 wherein the step of detecting the first data set having the route determinant characteristic that is inconsistent with the data access route specified for the first data set includes the step of performing a comparison operation for the first data set in response to an access request for the first data set, the comparison operation determining if the route determinant characteristic for the first data set is inconsistent with the access route specified for the first data set.

4. The method of claim 1 wherein the step of specifying the different data access route for the first data set includes transferring data for the first data set from a first route accessible space to a second route accessible space.

5. The method of claim 4 wherein the step of transferring data for the first data set includes temporarily storing data for the first data set in buffer memory separate from the data storage device.

6. The method of claim 4 further including the step of aborting the transfer of data for the first data set from the first route accessible space to the second route accessible space in the event that the transfer is unable to complete.

7. The method of claim 4 further including the step of delaying execution of a data set access request for the first data set which would interfere with the transfer of data for the first data set from the first route accessible space to the second route accessible space.

8. A method for managing file access in a data storage system utilizing a block access data storage device, the method including the steps of:
   (a) maintaining file abstractions for data stored by the data storage system;
   (b) providing both a file system access route to the block access data storage device and a direct block access route to the block access data storage device;
   (c) specifying a file access route for each file stored by the data storage system, wherein specifying the file access route for each file stored by the data storage system includes storing an indication of the respective file access route for each respective file stored by the data storage system;
   (d) detecting a first file having a route determinant characteristic that is inconsistent with the respective file access route specified for the first file, the respective file access route comprising one of the file system access route or the direct block access route; and
   (e) specifying a different file access route for the first file, the different file access route being consistent with the route determinant characteristic for the first file and comprising the other one of the file system access route or the direct block access route, wherein specifying the different file access route for the first file includes storing an indication of the different access route for the first file.

9. The method of claim 8 further including the step of performing a comparison operation at predetermined time intervals and wherein the step of detecting the first file having the route determinant characteristic that is inconsistent with the file access route specified for the first file is accomplished in the comparison operation.

10. The method of claim 8 wherein the step of detecting the first file having the route determinant characteristic that is inconsistent with the file access route specified for the first file includes the step of performing a comparison operation for the first file in response to a file access request for the first file, the comparison operation determining if the route determinant characteristic for the first file is inconsistent with the access route specified for the first file.

11. The method of claim 8 wherein the step of specifying the different file access route for the first file includes transferring data for the first file from a first route accessible space allocated for the one of the file system access route or the direct block access route to a second route accessible space allocated for the other one of the file system access route or the direct block access route.

12. The method of claim 11 wherein the step of transferring data for the first file includes temporarily storing data for the first file in buffer memory separate from the first route accessible space and the second route accessible space.

13. The method of claim 11 further including the step of aborting the transfer of data for the first file from the first route accessible space to the second route accessible space in the event that the transfer is unable to complete.

14. The method of claim 11 further including the step of delaying execution of a file access request for the first file which would interfere with the transfer of data for the first file from the first route accessible space to the second route accessible space.

15. A program product for managing the data access routes in a data storage system that provides alternative data access routes to a data storage device, the program product being stored on a computer readable medium and including:
   (a) mismatch detection program code for detecting a first data set having a route determinant characteristic that is inconsistent with a data access route specified for the first data set; and
   (b) access route altering program code for specifying a different data access route for the first data set, the different data access route being consistent with the route determinant characteristic for the first data set wherein specifying the different data access route for the first data set includes storing an indication of the different access route for the first data set.

16. The program product of claim 15 wherein the mismatch detection program code includes comparison program code for executing a comparison operation at predetermined time intervals and wherein detecting the first data set is accomplished in the comparison operation.

17. The program product of claim 15 wherein the mismatch detection program code includes comparison program code for executing a comparison operation for the first data set in response to a data set access request for the first data set, the comparison operation determining if the route determinant characteristic for the first data set is inconsistent with the data access route specified for the first data set.

18. The program product of claim 15 wherein the access route altering program code includes data transfer program code for transferring data for the first data set from a first route accessible space to a second route accessible space.

19. The program product of claim 18 wherein the data transfer program code causes data for the first data set to be stored temporarily in buffer memory separate from the first route accessible space and the second route accessible space.

20. The program product of claim 18 further including access delaying program code for delaying execution of a data set access request for the first data set which would interfere with the transfer of data for the first data set from the first route accessible space to the second route accessible space.

21. A program product for managing file access in a data storage system utilizing a block access data storage device and providing both a file system access route to the block access data storage device and a direct block access route to the block access data storage device, the program product being stored on a computer readable medium and including:
 (a) file system program code for maintaining file abstractions for data stored by the data storage system;
 (b) route specifying program code for specifying a file access route for each file stored by the data storage system, wherein specifying the file access route for each file stored by the data storage system includes storing an indication of the respective access route for each respective file stored by the data storage system;
 (c) mismatch detection program code for detecting a first file having a route determinant characteristic that is inconsistent with the respective file access route specified for the first file, the respective file access route comprising one of the file system access route or the direct block access route; and
 (d) access route altering program code for specifying a different file access route for the first file, the different file access route being consistent with the route determinant characteristic for the first file and comprising the other one of the file system access route or the direct block access route wherein specifying the different file access route for the first file includes storing an indication of the different access route for the first file.

22. The program product of claim 21 wherein the mismatch detection program code includes comparison program code for executing a comparison operation at predetermined time intervals and wherein detecting the first file is accomplished in the comparison operation.

23. The program product of claim 21 wherein the mismatch detection program code includes comparison program code for executing a comparison operation for the first file in response to a file access request for the first file, the comparison operation determining if the route determinant characteristic for the first file is inconsistent with the file access route specified for the first file.

24. The program product of claim 21 wherein the access route altering program code includes data transfer program code for transferring data for the first file from a first route accessible space to a second route accessible space.

25. The program product of claim 24 wherein the data transfer program code causes data for the first file to be stored temporarily in buffer memory separate from the first route accessible space and the second route accessible space.

26. The program product of claim 24 further including access delaying program code for delaying execution of a file access request which would interfere with the transfer of data for the first file from the first route accessible space to the second route accessible space.

27. The program product of claim 24 wherein the data transfer program code aborts the transfer of data for the first file from the first route accessible space to the second route accessible space in the event that the transfer is unable to complete.

* * * * *

UNITED STATES PATENT AND TRADEMARK OFFICE
CERTIFICATE OF CORRECTION

PATENT NO. : 7,171,396 B2 Page 1 of 1
APPLICATION NO. : 10/116338
DATED : January 30, 2007
INVENTOR(S) : Douglas L. Voigt It is certified that error appears in the above-identified patent and that said Letters Patent is hereby corrected as shown below:

In column 2, line 34, after "routes" delete "ch as" and insert -- such as --, therefor.

In column 18, line 59, in Claim 15, after "set" insert -- , --.

In column 20, line 6, in Claim 21, after "route" insert -- , --.

Signed and Sealed this

Twentieth Day of July, 2010

David J. Kappos
*Director of the United States Patent and Trademark Office*